United States Patent [19]

John

[11] Patent Number: 4,613,384

[45] Date of Patent: Sep. 23, 1986

[54] CORROSION INHIBITOR

[75] Inventor: Glyn R. John, Cheshire, England

[73] Assignee: Imperial Chemical Industries PLC, London, England

[21] Appl. No.: 788,208

[22] Filed: Oct. 16, 1985

[30] Foreign Application Priority Data

Oct. 16, 1984 [GB] United Kingdom ............... 8426103

[51] Int. Cl.[4] ............................................. C23C 22/00
[52] U.S. Cl. ............................ 148/6.14 R; 106/14.15; 106/14.37

[58] Field of Search .................... 106/14.15, 14.37; 148/6.14 R

[56] References Cited

U.S. PATENT DOCUMENTS 4,466,846 8/1984 Frank ............................ 148/6.14 R Primary Examiner—Sam Silverberg
Attorney, Agent, or Firm—Cushman, Darby & Cushman

[57] ABSTRACT

The invention discloses a process to inhibit corrosion of mild galvanized steel by treatment with an optionally substituted bis(oximinomethyl)alkyl phenol, especially 2,6-bis(oximinomethyl)-4-nonyl or dodecyl phenols.

7 Claims, No Drawings

CORROSION INHIBITOR

This invention relates to a process for the inhibition of corrosion of metals.

Various corrosion inhibitors are known, the majority of which are of the reservoir type and are included as additives to water, solvent or oil-based systems used in contact with the metal. Thus such inhibitors are included for example in boiler waters where they are continuously contacted with the surface to be treated.

Corrosion inhibitors which are applied to a metal surface and form a protective coating which does not need to be continuously replenished are also known, and zinc phosphate and chromate treatments are conventionally used for this purpose. However, such treatments provide only limited protection and may have adverse environmental implications.

Other agents, such as tannic acid, act as so called "rust converters" on application to an already rusted surface. However such agents generally have a limited effect in terms of the inhibition of further rusting.

According to the present invention there is provided a process for the inhibition of the corrosion of metals which comprises treating the metal with an optionally substituted bis(oximinomethyl)alkylphenol of formula (1):

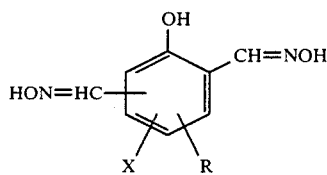

wherein R is an alkyl substituent containing from 7 to 13 carbon atoms and X is hydrogen or an optional substituent.

The alkyl substituent, R, may be linear or branched, saturated or unsaturated. Branched alkyl groups are especially preferred.

As optional substituents, X, in the benzene ring of the bis(oximinomethyl)alkylphenol there may be mentioned for example alkyl, aryl, alkoxy and aralkyl groups and more preferably halogen or nitro groups.

The second oximinomethyl group (—CH=NOH) is preferably in the 6- position, and preferred compounds of use in the present invention are thus optionally substituted 2,6-bis(oximomethyl)alkylphenols. Especially preferred compounds for use in the present invention are optionally substituted 2,6-bis(oximinomethyl)-4-alkylphenols.

The bis(oximinomethyl)alkylphenol may be used in admixture with other corrosion inhibitors, and in particular may be used in admixture with 2-hydroxy-5-alkyl-benzaldoxime corrosion inhibitors wherein the 5-alkyl group contains from 7 to 13 carbon atoms such as are disclosed in our copending United Kingdom patent application No. 8408949. The scope of the present invention includes the use of such mixtures.

The process of the present invention is especially suitable for the corrosion inhibition of iron, zinc, copper, tin and aluminium and in particular mild steel and the zinc surface of galvanised steel.

The metal may be treated directly with the bis(oximinomethyl)alkylphenol, although it is generally preferred to apply the bis(oximinomethyl)alkylphenol to the metal surface in the form of a solution in a suitable organic solvent or as an aqueous emulsion of the bis(oximinomethyl)alkylphenol or as an aqueous emulsion of a solution of the bis(oximinomethyl)alkylphenol in an organic solvent. The bis(oximinomethyl)alkylphenol may be used to provide a protective coating in its own right; or as as a metal pre-treatment before the application of a surface coating; or may be incorporated into a surface coating composition.

Conventional organic solvents may be used for the bis(oximinomethyl)alkylphenol and include for example alcohols, ethers, ketones and aliphatic and aromatic hydrocarbons. Especially preferred solvents are those having good wetting and drying properties and include for example ethanol, isopropanol, toluene, xylene, chloroform and 1,1,1-trichloroethane.

Aqueous emulsions of the bis(oximinomethyl)alkylphenol may be formed in conventional manner using conventional dispersants and surfactants, including non-ionic dispersants.

Preferably the metal is treated with the bis(oximinomethyl)alkylphenol and the treated surface is simultaneously or subsequently contacted with water to assist the formation of a protective complex between the metal and the bis(oximinomethyl)alkylphenol. Thus when the bis(oximinomethyl)alkylphenol is used directly or as a solution in an organic solvent, the metal surface may be contacted subsequently with liquid water for a period sufficient for the complex between the metal and the bis(oximinomethyl)alkylphenol to be developed, for example from one to four hours. Water vapour in the atmosphere may also be used, and in this case the protective complex may take several days to be fully developed. In general the formation of the protective complex in the presence of water or water vapour will take place in preference to the rusting process, and there is thus no particular disadvantage if the protective complex builds up over a period of time.

It may be convenient to treat the metal with an aqueous emulsion of the bis(oximinomethyl)alkylphenol, since the treatment with the bis(oximinomethyl)alkylphenol and the contacting with water may then take place simultaneously, and a protective coating may be formed during contact times may be as short as one to five minutes. Liquid bis(oximinomethyl)alkylphenols which can be formed directly into an emulsion are especially preferred.

The process of the present invention may provide corrosion inhibition either without the application of a further surface coating or as a pre-treatment before the application of a further surface coating. Thus the treatment may be used for example as a temporary protection whilst the metal is being transferred from one site to another. If desired, the protective complex between the metal and the bis(oximinomethyl)alkylphenol may be removed by treatment with a suitable solvent, for example one of the solvents mentioned above. Thus the process of the present invention may be used for the temporary protection of a metal surface and the protective coating subsequently dissolved before or during further processing.

Alternatively, the bis(oximinomethyl)alkylphenol may be formulated in a surface coating composition, for example a paint (primer), lacquer, resin or other protective coating. The surface coating may be a solvent-based composition, for example a cellulose/solvent based primer paint such as those used for car "touch up" paints. The bis(oximinomethyl)alkylphenol is soluble in solvents generally used for such primers (for example nitrocellulose) and may be incorporated directly. The bis(oximinomethyl)alkylphenol may also be incorporated in aqueous emulsion surface coating systems, for example primers or protective coatings based on polymer latices such as for example acrylic and styrene/acrylic latices and vinyl acrylic co-polymer latices including acrylate modified vinyl chloride-vinylidene chloride copolymer latices. The bis(oximinomethyl)alkylphenol may also for example be incorporated in temporary alkali-removable protective coatings (whether solvent-based or emulsion-based) of the addition polymer type in which the polymer contains carboxyl groups, for example the alkali-removable protective coating described in United Kingdom Patent Application No. 84 12434.

The bis(oximinomethyl)alkylphenol or the solution or emulsion thereof may be applied to the metal in conventional manner, for example by dipping, spraying or brushing. The temperature of the application may be from 0 to 50° C., although faster formation of the protective coating may take place at the higher range of temperatures, for example 25° to 50° C. Typically, solutions of the bis(oximinomethyl)alkylphenol may contain from 0.1 to 10% by weight of bis(oximinomethyl)alkylphenol, whilst emulsions preferably contain from 0.1 to 5% by weight of bis(oximinomethyl)alkylphenol. The presence of from 0.1 to 2% by weight of the bis(oximinomethyl)alkylphenol in a surface coating emulsion formulation is generally sufficient to provide improved corrosion inhibition.

The metal to be treated may be brightly polished and/or freshly cleaned, but it is an advantageous feature of the process of the present invention that effective corrosion inhibition may be obtained even on a lightly rusted surface. Indeed we have found that better results are in general achieved when a surface is treated in an "as received" condition than when that same surface is freshly cleaned or brightly polished.

The process of the present invention may be combined with conventional corrosion inhibition treatments such as the phosphating of iron, and very effective corrosion inhibition is obtained when the process of the present invention is applied to a phosphated iron surface.

Whilst the scope of the present invention is not to be taken as being limited by any one particular theory, it is believed that the process of the present invention leads to the formation of a chemically bound complex between the bis(oximinomethyl)alkylphenol and the metal/metal oxide surface, thereby providing the corrosion inhibition. In the treatment of iron, the formation of the complex may be monitored by the development of a slight colouration on the surface. In the treatment of zinc and galvanised steel, the complex is colourless and the treatment is therefore visually unobtrusive. The layer of bis(oximinomethyl)alkylphenol on the metal surface generally forms a dry (as opposed to sticky) film which is easy to handle with very little tendency to pick up dirt or dust.

As indicated above, the process of the present invention is equally effective on lightly rusted iron surfaces, and may be used in this context as a "rust converter". We have found that the process of the present invention generally provides improved protection as compared with conventional "rust converters" based on tannic acid.

Improved corrosion inhibition is obtained when the complex between the metal surface and the bis(oximinomethyl)alkylphenol is stable and insoluble in water or dilute acidic or saline compositions such as may be encountered on exposure to the atmosphere. We have found that optionally substituted 4-alkyl-2,6-bis-(oximinomethyl)phenols wherein the 5-alkyl group contains 7 or more carbon atoms are especially suitable for this purpose. Especially suitable alkyl groups include heptyl, octyl, nonyl and dodecyl.

The invention is illustrated by the following Examples in which all parts and percentages are by weight unless otherwise stated.

EXAMPLE 1

Bright mild steel 1 inch×1 inch coupons were thoroughly washed with acetone followed by ethanol and stored in kerosene until required. Immediately prior to use they were washed in acetone.

A test coupon prepared as above was immersed in a 5% solution of 2,6-bis(oximinomethyl)-4-nonylphenol in 1,1,1-trichloroethane and after evaporation of the solvent was transferred to distilled water. A control coupon prepared in the same manner, but not treated with the bis(oximinomethyl)alkylphenol, was similarly immersed in distilled water. After 35 days, the test coupon had developed a slight blue black colouration with no signs of rusting. In contrast, the control coupon was heavily rusted within 2 days.

EXAMPLE 2

Bright mild steel coupons were treated with a 5% solution of 2,6-bis(oximinomethyl)-4-nonylphenol in 1,1,1-trichloroethane as described in Example 1, and were placed inside a humidity cabinet operating at 100% relative humidity and at a constant temperature of 40° C. After more than 1,000 hours continuous exposure, the coupons were found to be totally rust free and showed slight colouration due to the formation of a complex with the metal surface. In contrast untreated control coupons showed substantial rusting within 1 weeks exposure under these conditions.

EXAMPLE 3

The procedure of Example 2 was repeated except that 2,6-bis(oximinomethyl)-4-dodecylphenol was used as corrosion inhibitor. In this test no rusting was observed after more than 1,000 hours and slight colouration of the metal surface had taken place.

EXAMPLE 4

Bright mild steel 6 inch by 3 inch 'Q' panels were treated with a 5% solution of 2,6-bis(oximinomethyul)-4-nonylphenol in 1,1,1-trichloroethane, and exposed to the atmosphere for 4 weeks. During this time the surfaces exposed directly to the weather developed a slight blue-black colouration, but showed no signs of rusting. In contrast, a control panel which had received no treatment was heavily rusted after only 1 week.

EXAMPLE 5

The procedure of Example 4 was repeated except that 2,6-bis(oximinomethyl)-4-dodedylphenol was used as the corrosion inhibitor. In this test, treated panels developed very slight blue-black colouration but showed no signs of rust after 4 weeks exposure.

EXAMPLE 6

2,6-Bis(oximinomethyl)-4-dodecylphenol was added at a concentration of 5% by weight to a solution of acrylic polymer in industrial methylated spirit at 16% solids. After thorough mixing, the polymer mix containing the dioxime was applied by brushing to the surface of a mild steel panel and allowed to dry and harden for several hours.

A control sample using the acrylic polymer solution but no added dioxime was prepared in a similar way.

Both test sample and control were scratched with a large cross to penetrate the coatings and then fully immersed in distilled water.

On removal of the panels after 9 days, it was seen that the panel that was treated with the polymer containing the dioxime showed little sign of rusting within the confines of the scratch while the rest of the surface was totally unaffected.

In contrast, the control panel that had been treated with unmodified polymer showed very heavy rusting due to under-film attack emanating from the scratch as well as comprehensive film breakdown.

I claim:

1. A process for the inhibition of the corrosion of metals which comprises treating the metal with an optionally substituted 2-6bis(oximinomethyl)-4-alkyl phenols of formula (I)

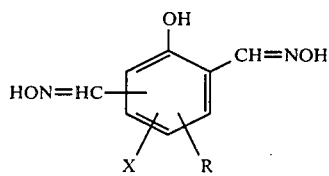

wherein R is an alkyl substituent containing from 7 to 13 carbon atoms and X is hydrogen or an optional substituent.

2. A process according to claim 1 characterised in that the substituted bis (oximinomethyl)alkylphenol is in the form of a solution in an organic solvent or in the form of an aqueous emulsion of a solution in an organic solvent.

3. A process according to claim 1 characterised in that the bis(oximinomethyl)alkylphenol is 2,6-bis(oximinomethyl)-4-nonylphenol or 2,6-bis (oximinomethyl)-4-dodecylphenol.

4. A process according to claim 1 characterised in that the bis (oximinomethyl)alkylphenol is present in a surface coating composition.

5. A process according to claim 4 characterised in that the surface coating composition is a paint or a primer paint.

6. A process according to claim 1 characterised in that the metal is iron, zinc, copper, tin or aluminium.

7. A process according to claim 6 characterised in that the metal treated has a lightly rusted iron surface.

* * * * *